March 12, 1940.  W. A. SANDBERG  2,193,209
STEAM AND GAS SEPARATOR
Filed July 19, 1938  2 Sheets-Sheet 1

WILLIAM A. SANDBERG
Inventor
Paul W. Bregman
Attorney

UNITED STATES PATENT OFFICE 2,193,209

STEAM AND GAS SEPARATOR

William A. Sandberg, Los Angeles, Calif.

Application July 19, 1938, Serial No. 220,031

2 Claims. (Cl. 183—79)

The object of the invention is to provide a device for the separation of entrained liquid mists from flow streams of gas or steam.

According to the principle of the invention, a horizontally disposed flow stream of the gas or vapor is given a rotative motion by which a centrifugal force is produced and the suspended liquid particles (together with any solid particles) are progressively moved toward the periphery of the stream; the liquid particles are collected and coalesced on the wall of the tube retaining the stream, and the liquid is withdrawn through a slot in the lower side of the tube, along substantially its entire length, into a series of liquid sealed compartments, the velocity of the gaseous stream thus being maintained constant along its entire length, and finally, these compartments drain into a common chamber in communication with the gas inlet and in which inlet gas pressure is maintained.

Apparatus embodying the above principles may take various forms, suited to varied uses, three such modifications being illustrated in the accompanying drawings, in which.

Figure 1:
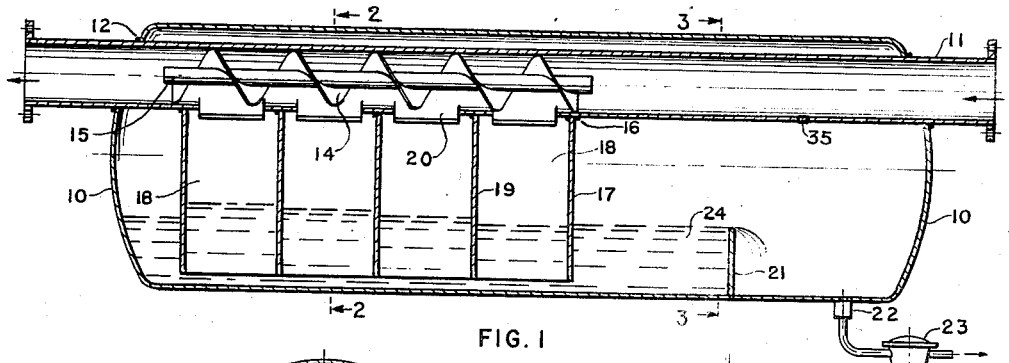
Fig. 1 represents in longitudinal section and internal elevation a simple form of the invention adapted for use as a separator on steam lines.
Figure 2:
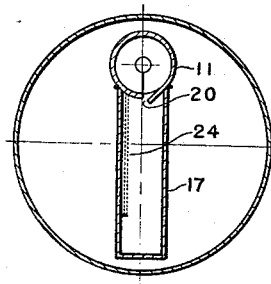
Fig. 2 is a cross section on the line 2—2 of Fig. 1.
Figure 3:
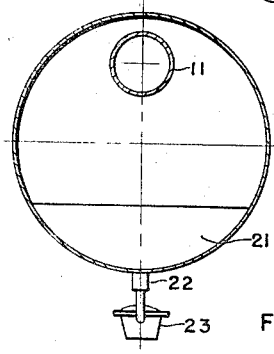
Fig. 3 is a cross section on the line 3—3 of Fig. 1.

Referring first to Figs. 1 to 3, 10 is a shell adapted to hold the required steam pressure; 11 is a tube extended longitudinally through the upper part of the shell and welded to its heads as at 12—12. This pipe is provided with a small opening 35, conveniently located, for equalizing pressures in tube 11 and shell 10.

Inside tube 11 is placed a metallic helix 14, as for example a section of elevator flight, closely fitted to the wall of the pipe. This helix may be stiffened by a rod or bar 15, which may be a small diameter pipe with plugged ends.

Below tube 11 and attached to it as by welds 16—16 is a rectangular collecting chamber 17 which is divided into a plurality of compartments 18—18 as by partition plates 19—19, which also are welded to the pipe to prevent mutual communication. These compartments are open at the bottom and in free communication with the interior of the shell.

Between the partitions, the pipe is slitted along its lower center line and one edge of the slit is dressed downwardly to form a tangential slot 20. This slot should coincide with the direction of revolution of the helix 14.

Within the shell and between one of its ends and the end of trunk 17 is placed a weir 21, non-leakably attached to the lower part of the shell. This weir should be of such height that water or other liquid collecting behind it will seal the open lower ends of compartments 18—18. A drain vent 22 is provided to conduct water flowing over the dam to any steam trap 23 through which the water is drained from the system.

Finally, and only as a preference, the side of each compartment toward which the slot 20 is directed may be covered with one or more layers of wire gauze or fine wire screen, as indicated at 24.

A column of steam flowing from right to left through tube 11, as indicated by the arrows, is given a rotary motion in passing over the helix 14 and entrained water particles are thrown against the sides of the tube. These water particles coalesce to form a liquid film which flows through slots 20 into compartments 18. These compartments afford zones of quiescence in which the liquid particles passing through the slot may subside and join the water body 24 which forms back of dam 21. Any particles forcibly projected through the slot are collected on the more or less absorbent surface of gauze 24.

When the device is first placed in use, steam passes through the compartments into the shell and condenses until it fills the shell with liquid to the level of the weir 21. As the shell has no outlet, the pressure within it is static and substantially equal to that existing in the inlet end of the separating tube. The water body outside the collecting chamber will therefore stand at the level maintained by the dam, while within the compartments 18 the water will stand at the successively slightly higher levels due to pressure drop in the steam column passing over the helix. If used for separating liquid from an incondensible gas the shell should be filled with liquid to the top of the weir when the apparatus is put into service.

This device will remove substantially all the water or other liquid from even very wet steam or wet gases with only a slight drop in pressure. The placing of the drainage compartments within a pressure chamber positively inhibits return flow or hunting through the drainage slots and ensures constancy of operation. The pressure chamber also provides considerable storage capacity to take care of sudden gushes of liquid, as occasioned by a boiler priming, and permits the use of a single steam trap for removal of the water.

Figure 4:
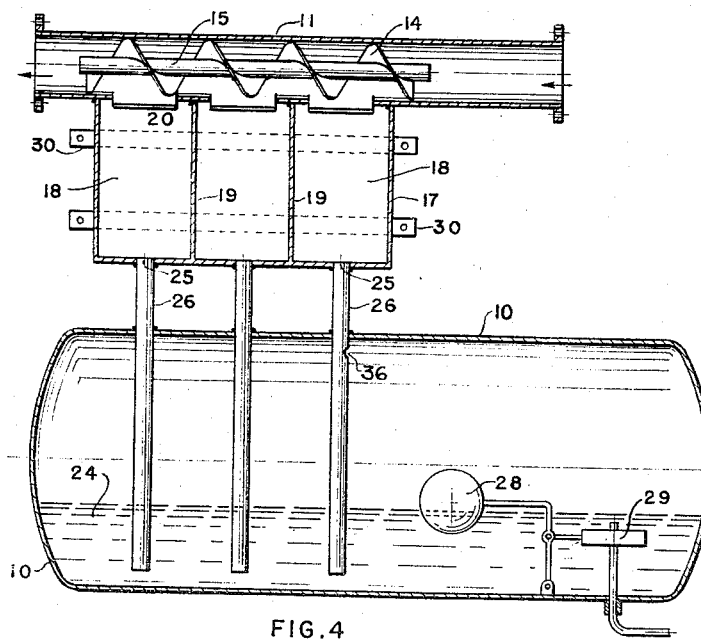
Fig. 4 represents in the same manner as Fig. 1 a modification of the invention somewhat different in detail.
Figure 5:
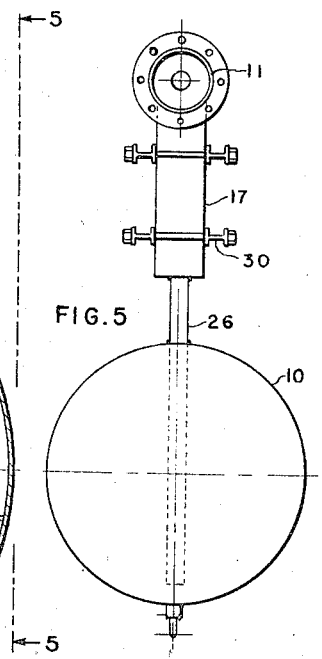
Fig. 5 is an end elevation as on line 5—5 of Fig. 4.

The form shown in Figs. 4 and 5 is the same in principle but differs in structure in that the separating tube 11 and its contained helix are placed outside instead of inside the pressure tank.

Referring to Figs. 4 and 5, 10 is the pressure shell, 11 the separating tube, and 14 the helix therein. The collecting chamber 17 is nonleakably attached to the lower side of tube 11 as in the first form, but the compartments 18—18 are closed at the bottom except for openings 25—25 communicating with pipes 26—26 which pass through the upper side of the shell and are made fast therein. These pipes are open at their lower ends and are terminated somewhat above the bottom of the shell as at 27—27. One or more of these pipes is provided with a pressure equalizing opening 36.

In place of the weir used in the first form and requiring a steam trap I may use, in either form, a float 28 actuating a piston or other valve 29 by which the liquid level in the shell is controlled. It is desirable to stiffen the exposed flat sides as by means of the beams 30, which may be of I or channel section.

Figure 6:
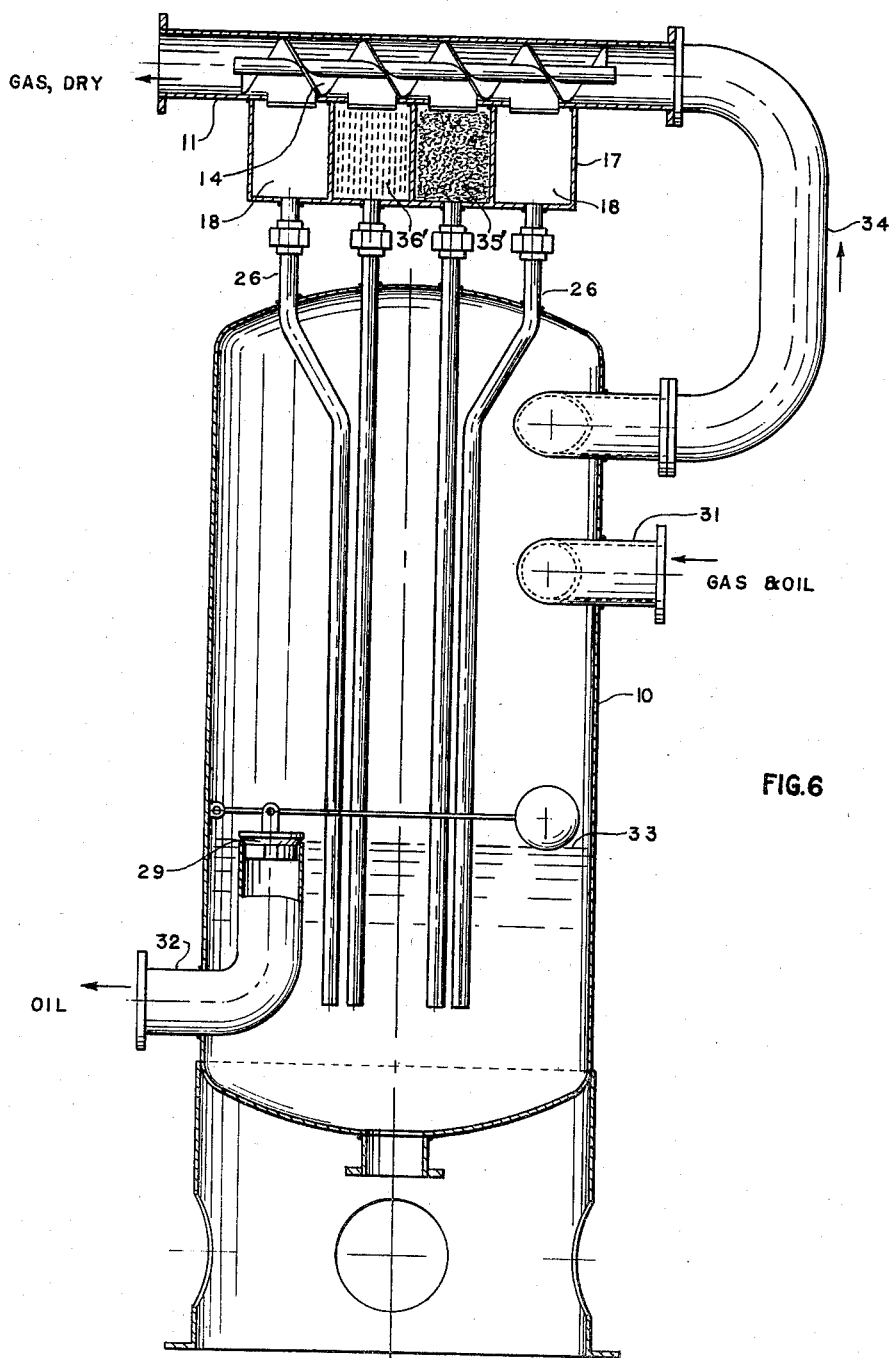
Fig. 6 is a section and internal elevation of a modification adapted particularly to separate oil from natural gas, as at the outlet of an oil well.

Referring now to Fig. 6, the shell 10 is vertically instead of horizontally arranged and is equipped to function as a conventional oil-gas separator, this form being particularly adapted to handle the mixture of gas and oil produced by flowing wells and in which the proportion of liquid is large.

An inlet 31, which preferably is arranged tangentially in the shell, is connected to the flow line from the well. An outlet 32 at a much lower level conducts the separated oil away from the shell. A preferred liquid level 33 is maintained in the shell by any desired type of float valve or liquid level control indicated at 29.

The separating tube 11 with its helix 14 is mounted above the top of the shell and is provided, as in the last form described, with a collecting chamber 17 divided into compartments 18—18. These compartments are provided with individual pipes 26—26 extending through and sealed into the head of the shell and extending to a level well below that at which the oil body 33 is to be maintained.

Near the upper end of the shell a pipe 34 affords communication between its interior and the inlet end of separating tube 11.

A stream consisting of slugs of gas and oil, or a gas-oil froth, being introduced to shell 10 through pipe 31, the liquid is in large part thrown to the wall of the shell and flows down to join the oil body 33, from which it is continuously withdrawn through pipe 32. The gaseous portion of the stream, containing more or less oil in suspension, passes through pipe 34 into separating tube 11, in which the oil mist is separated as above described, clean gas being discharged from the outlet end of tube 11. The oil mist is coalesced in chambers 18 and flows through pipes 26 to join the main oil body 33.

The pressure usually existing in the flow line may be released before the gas-oil mixture enters the separator, or at the discharge end of tube 11 as may be preferred, or in some cases the pressure drop incident to the passage of a high velocity gas stream over the helix 14 may afford sufficient drop in pressure.

In this and in the other forms of the invention it is often desirable to fill some of the compartments 18 (but only above the liquid level in the form of Fig. 1) with steel wool as indicated at 35' or with loosely rolled wire mesh screen as indicated at 36'. This filling should not be placed in the first chamber in the direction of gas flow and is preferably used only in the last one or two compartments.

In the specification and in the claims the words "steam" and "gas" are used interchangeably and as fully equivalent.

The purpose in providing a plurality of compartments 18 arranged along the length of the tube containing the helix is to drain the entire length of the tube without permitting the gas flow to bypass any material portion of such length. If the compartment partitions are omitted, the back pressure due to the presence of the helix in the tube causes part of the gas flow to pass through slot 20 adjacent the inlet end of the tube and to pass back through the slot into the tube toward the outlet end. This bypassed gas is not deprived of any material part of its liquid particles and seriously reduces the effectiveness of the device for clean stripping. For the same reason the lower end of each compartment must be individually liquid sealed to prevent short circuiting between the bottoms of the compartments.

It has been found that even within the relatively short length of a single compartment there is more or less flow of gas into the compartment at the upstream end of the slot, this gas returning through the slot at its downstream end. This is particularly the case where the tube velocity is high and the pressure drop correspondingly exaggerated. The arrangement of wire gauze or other liquid particle entrapping material on the side of the compartment toward which the slot is directed (as at 24 in Fig. 2) or the substantial filling of the compartment with such material (as at 35' or 36' in Fig. 6) aids materially in separating and coalescing suspended liquid particles from such gas as circulates within the compartment and thus adds, often to an important degree, to the overall effectiveness of the apparatus.

I claim as my invention:

1. A gas-liquid separator comprising: a horizontal gas-flow tube; a helical vane closely fitting in said tube and arranged to prevent flow of gas therethrough other than along the face of said vane; a relatively long and narrow collecting chamber nonleakably attached to the lower side of said tube and extending substantially the length of said vane; partitions extending the full depth of said chamber and dividing said chamber into a plurality of gas-tight compartments; tangentially directed slots formed in the wall of said tube along its lower center line, each said slot affording communication between the interior of said tube and one only of said compartments; a common receiving shell arranged to receive liquid drainage from all of said compartments; means for maintaining a pool of drainage liquid at substantially constant level in said shell, said pool sealing the bottom of each said compartment and preventing the passage of gas from one of said compartments to another of said compartments; means for automatically and continuously removing excess drainage liquid from said shell, and a passage arranged to equalize the pressure within said shell with the pressure within said tube at the upstream end of said vane.

2. A gas-liquid separator comprising: a horizontal gas-flow tube; a helical vane closely fitting in said tube and arranged to prevent flow of gas therethrough other than along the face of said vane; a relatively long and narrow collecting chamber nonleakably attached to the lower side of said tube and extending substantially the length of said vane; partitions extending the full depth of said chamber and dividing said chamber into a plurality of gas-tight compartments; tangentially directed slots formed in the wall of said tube along its lower center line, each said slot affording communication between the interior of said tube and one only of said compartments; a common receiving shell arranged to receive liquid drainage from all of said compartments, and means for maintaining a pool of drainage liquid at substantially constant level in said shell, said pool sealing the bottom of each said compartment and preventing the passage of gas from one of said compartments to another of said compartments.

WILLIAM A. SANDBERG.